(12) United States Patent
Münzenberg et al.

(10) Patent No.: US 8,629,297 B2
(45) Date of Patent: Jan. 14, 2014

(54) LOW-FOAMING SURFACTANTS

(75) Inventors: Cindy Münzenberg, Düsseldorf (DE); Helena Wiethoff, Düsseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 13/395,968

(22) PCT Filed: Sep. 9, 2010

(86) PCT No.: PCT/EP2010/005554
§ 371 (c)(1),
(2), (4) Date: Mar. 14, 2012

(87) PCT Pub. No.: WO2011/032664
PCT Pub. Date: Mar. 24, 2011

(65) Prior Publication Data
US 2012/0172618 A1  Jul. 5, 2012

(30) Foreign Application Priority Data
Sep. 17, 2009 (EP) .................................. 09290710

(51) Int. Cl.
*C07C 271/16* (2006.01)
(52) U.S. Cl.
USPC ........................................................ 560/160

(58) Field of Classification Search
CPC ...................................................... C07C 271/16
See application file for complete search history.

(56) References Cited

U.S. PATENT DOCUMENTS

| 6,492,457 B2 * | 12/2002 | Dworak et al. ............... 524/591 |
| 6,646,153 B1 * | 11/2003 | Huybrechts ................... 560/158 |
| 7,045,577 B2 | 5/2006 | Wilkes et al. |
| 7,329,773 B2 | 2/2008 | Stone et al. |
| 2004/0236119 A1 | 11/2004 | Van Holen et al. |
| 2005/0113594 A1 | 5/2005 | Van Holen |
| 2006/0084779 A1 | 4/2006 | Dietsche et al. |
| 2007/0197820 A1 | 8/2007 | Van Holen et al. |

FOREIGN PATENT DOCUMENTS

| WO | WO-03/066580 | 8/2003 |
| WO | WO-2004/050888 | 6/2004 |

OTHER PUBLICATIONS

"International Search Report of PCT/EP2010/005554", mailed on Jun. 16, 2011, 2 pages.

* cited by examiner

*Primary Examiner* — Paul A Zucker
(74) *Attorney, Agent, or Firm* — Servilla Whitney LLC

(57) ABSTRACT

Described are alkoxylated urethanes. Specifically, the alkoxylated urethanes are non-isocyanate urethanes (NIUs). The non-isocyanate urethanes that are described can be used as low-foam surfactants and, more particularly, as low-foam wetting agents.

13 Claims, No Drawings

LOW-FOAMING SURFACTANTS

CROSS-REFERENCE TO RELATED APPLICATIONS

This application is the National Stage entry of PCT/EP2010/005554, filed on Sep. 9, 2010, which claims priority to European Patent application number 09290710.4, filed on Sep. 17, 2009, both of which are incorporated herein by reference in their entireties.

TECHNICAL FIELD

The invention relates to the special alkoxylated urethanes and also to their use as low-foam surfactants and more particularly as low-foam wetting agents.

BACKGROUND

Urethanes are prepared conventionally by reacting alcohols with isocyanates. The characteristic of this class of compound, i.e., of the urethanes, is the urethane group —O—CO—NH—. An alternative in the generation of urethane groups is the reaction of a cyclic carbonate with a primary amine. The particular feature of this synthetic access to urethanes is that there is no need to use isocyanates as raw material. The skilled person refers to urethanes accessible via the latter synthesis route as "non-isocyanate urethanes" (NIUs). On the basis of their free OH group, NIUs are capable of further chemical modifications.

For the NIUs, for example, esterification or transesterification with acrylic acid derivatives is known; cf., e.g., US2005/0113594, US2004/0236119, U.S. Pat. No. 7,045,577, U.S. Pat. No. 7,329,773, US2007/0197820. These acrylic compounds thus prepared find use as crosslinkable coatings.

SUMMARY

Embodiments of the present invention are directed toward compounds of the structure (I),

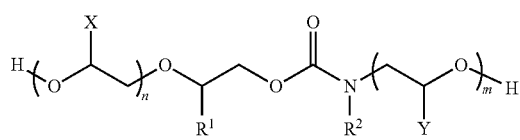

wherein $R^1$ is hydrogen, an alkyl radical having 1 to 3 C atoms or a $R^3$ group; $R^2$ is an alkyl group having 2 to 22 C atoms, wherein the alkyl group is linear or branched or cyclic and also saturated or mono- or poly-olefinically unsaturated; $R^3$ is a saturated alkyl radical having 1 to 3 C atoms, and is substituted on one of the C atoms by a group —O—(CH$_2$—CHZ—O)$_p$—H; X, Y, and Z independently of one another are hydrogen radical or a methyl radical; and n and m independently of one another are a number in the range from 1 to 45 and p is a number in the range from 0 to 45, with the proviso that the sum n+m+p is in the range from 2 to 70.

In one or more embodiments, the radical $R^1$ is hydrogen. In other embodiments, the radical $R^1$ is an alkyl radical having 1 to 3 C atoms.

In one or more embodiments, the radicals X, Y, and Z are hydrogen.

In one or more embodiments, the sum n+m+p is in the range from 10 to 25.

In one or more embodiments the radical $R^1$ is hydrogen; the radical $R^2$ is a saturated, branched alkyl radical; the radicals X, Y, and Z are hydrogen; and the sum n+m+p (where p=0) is in the range from 10 to 25. In a specific embodiment, the radical $R^2$ is a 2-ethylhexyl group.

In a specific embodiment, the radical $R^1$ is a group $R^3$; $R^3$ is CH$_2$OH; the radical $R^2$ is a saturated, branched alkyl radical; the radicals X, Y, and Z are hydrogen, and the sum of n+m+p is in the range from 10 to 25.

Other embodiments of the present invention are directed to a method of using compounds of the structure (I) as low-foam surfactants.

DETAILED DESCRIPTION

There is a continual need for surfactants. For the very wide variety of end uses in which foam tends to be a nuisance, it is advantageous if these surfactants give rise to very little foam in aqueous systems. The present invention relates to low-foam surfactants. The intention more particularly was to provide low-foam wetting agents.

It has now been found that special derivatives of urethanes of the NIU type provide excellent low-foam surfactants.

The present invention provides compounds of the structure (I)

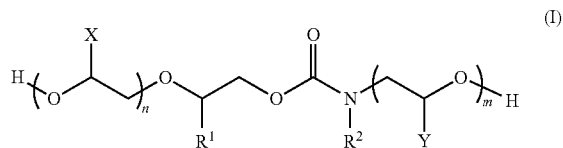

in which:
$R^1$ is hydrogen, an alkyl radical having 1 to 3 C atoms or a group $R^3$,
$R^2$ is an alkyl group having 2 to 22 C atoms, it being possible for this radial to be linear or branched or cyclic and also saturated or mono- or poly-olefinically unsaturated,
$R^3$ is a saturated alkyl radical having 1 to 3 C atoms, this alkyl radical being substituted on one of the C atoms by a group —O—(CH$_2$—CHZ—O)$_p$—H,
X, Y and Z independently of one another are hydrogen radical or a methyl radical,
n and m independently of one another are a number in the range from 1 to 45 and p is a number in the range from 0 to 45, with the proviso that the sum n+m+p must lie in the range from 2 to 70.

The present invention further provides the use of compounds of the structure (I)

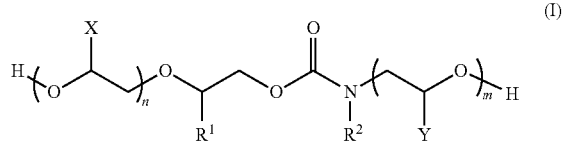

as low-foam surfactants. In the formula (I):
$R^1$ is hydrogen, an alkyl radical having 1 to 3 C atoms or a group $R^3$, $R^2$ is an alkyl group having 2 to 22 C atoms, it being possible for this radial to be linear or branched or cyclic and also saturated or mono- or poly-olefinically unsaturated, $R^3$ is a saturated alkyl radical having 1 to 3 C atoms, this alkyl radical being substituted on one of the C atoms by a group —O—(CH$_2$—CHZ—O)$_p$—H, X, Y and Z independently of one another are hydrogen radical or a methyl radical, n and m independently of one another are a number in the range from 1 to 45 and p is a number in the range from 0 to 45, with the proviso that the sum n+m+p must lie in the range from 2 to 70.

The compounds of the structure (I) are suitable more particularly as low-foam wetting agents.

EO and/or PO Units

The compounds (I) contain structural elements —(CH$_2$—CHX—O)$_n$—, —(CH$_2$—CHY—O)$_m$— and —(CH$_2$—CHZ—O)$_p$—, for which the above provisos apply.

It is noted that the formula notation used is intended to express the fact that the stated structural elements derive from ethylene oxide (EO) or propylene oxide (PO) in so far, indeed, as—logically for the case where the indices m, n and p are other than zero—these units result synthetically from an addition reaction of EO or PO, or ethylene glycol or propylene glycol (for n, m, p=1), or polyaddition of EO and/or PO, or polyethylene glycol or polypropylene glycol, or corresponding mixed EO-PO copolymers (for n, m, p≥2). It is further expressly noted that each of these structural elements—independently of one another—may be composed either exclusively of EO units or exclusively of PO units, and may also contain EO and PO units in mixed form, in blockwise or random distribution. The formulaic representation used for the stated structural elements therefore represents an abbreviated notation for the possibilities stated, which are obvious to the knowledgeable skilled person.

For instance, X=H and n=5 means that the structural element in question contains five EO units linked to one another, corresponding to a moiety —(O—CH$_2$—CH$_2$—)$_5$—; alternatively, X=CH$_3$ and n=5 means that the structural element contains five PO units linked to one another, corresponding to a moiety —(O—CH$_2$—CH(CH$_3$))$_5$—; in this case—as the skilled person is aware—the orientation of the methyl group within the structural element for each PO unit may be realized in one of two ways, namely as —(O—CH$_2$—CH(CH$_3$))— or —(O—CH(CH$_3$)—CH$_2$)—.

In the context of the present invention, the formula (I) is to be understood to mean that EO and PO units may be present simultaneously, including within the stated structural elements (this logically presupposes that the indices then each are at least the number 2). The expression "independently of one another" within the phrase that "X, Y and Z independently of one another are hydrogen radical or a methyl radical" therefore not only relates to the stated different structural elements, but also applies within one and the same structural element.

The Compounds (I)

The radical $R^2$ is an alkyl group having 2 to 22 and preferably 6 to 14 C atoms, and this radical may be:
a linear or branched or cyclic,
saturated or mono- or polyolefinically unsaturated.

Examples include the following alkyl radicals $R^2$: lauryl (C12), myristyl (C14), cetyl (C16), stearyl (C18), 2-ethylhexyl.

In one or more embodiments, the alkyl radicals $R^2$ are alkyl radicals, which are saturated and branched. In a specific embodiment, the alkyl radical $R^2$ is a 2-ethylhexyl group.

In one embodiment $R^1$ is hydrogen.

In one embodiment the radical $R^1$ is an alkyl radical having 1 to 3 C atoms.

In one embodiment all of radicals X, Y and Z are hydrogen.

In one embodiment, the sum n+m+p is in the range from 5 to 50 and more particularly from 10 to 25.

In one embodiment it is the case that n and m independently of one another are a number in the range from 3 to 45, more particularly 5 to 45 and preferably 10 to 45.

In one embodiment the following is the case: the radical $R^1$ is hydrogen, the radical $R^2$ is a saturated, branched alkyl radical; all of radicals X, Y and Z are hydrogen; the sum n+m+p lies in the range from 5 to 50 and more particularly from 10 to 25. Logically it is the case for this embodiment that the index p has the value zero.

In one embodiment the following is the case: the radical $R^1$ is a group $R^3$, $R^3$ having the definition CH$_2$OH; the radical $R^2$ is a saturated, branched alkyl radical; all of radicals X, Y and Z are hydrogen; the sum n+m+p lies in the range from 5 to 50 and more particularly from 10 to 25.

The compounds (I) are distinguished by surfactant properties. Their suitability as low-foam surfactants is very excellent. The term "surfactants" is known to the skilled person: accordingly, the term "surfactant" is a collective designation for interface-active compounds whose molecules have one or more lipophilic and one or more hydrophilic groups. As a result of their amphiphilic structure, surfactants accumulate at interfaces, thereby initiating numerous physicochemical phenomena, which govern inter alia the effect of the surfactants in the course of washing, wetting, emulsifying, dispersing, and cleaning. Often the term "surfactants" is used when wishing to refer to the stated typical structure of these compounds, whereas the term "wetting agents" is used when the wish is to place particular emphasis on the special wetting properties of the surfactants. In this regard, the term "surfactant" in comparison, for instance, to the term "wetting agent" is understood as a superordinate term, since the term "surfactant" is associated, as mentioned, with a series of functional properties (for instance, that surfactants, from a functional viewpoint, are in principle wetting agents (also called wetters), emulsifiers or dispersants). Of course, nothing is said about the quantitative extent to which a surfactant wets, emulsifies, disperses, etc.; as a general rule, therefore, the skilled person is unable, from a particular structure having hydrophilic and hydrophobic structural elements and which said skilled person wishes, in accordance with the definition above, to assign structurally to the surfactants, to predict the specific active properties of this structure. Surfactants, for instance, lower the surface tension of water; the extent to which they are able to do this is heavily dependent on their structure and cannot be clearly forecast, generally, in the case of complex molecules. For instance, methanol and soaps each contain a hydrophilic radical (an OH group in the case of methanol, a CO$_2$H group in the case of soaps) and a hydrophobic radical (a CH$_3$ group in the case of methanol, a long-chain alkyl group in the case of soaps); accordingly, in structural terms, both methanol and soaps can be assigned to the surfactants, but nevertheless there are fundamentally different physicochemical properties here, and methanol will hardly ever be used as a wetting agent or emulsifier, since the active properties in this respect are not sufficient.

The term "low-foam" is understood to mean that in an aqueous medium the compounds (I) exhibit only very low foaming: in the foam test described below, the compounds (I) exhibit foam height values of below 25 ml. The foam test to be applied is as follows: in a 250 ml wide-neck glass vessel, 200 g of a 0.25% strength by weight solution of the test substance in fully demineralized water are prepared. After a stirring time of 15 minutes, the stirring taking place by means of a magnetic stirring plate, a 100 ml measuring cylinder with ground glass joint is filled to 75 ml with the test solution and closed with a stopper. The cylinder is shaken for a time of 10 seconds and the foam height, in milliliters (ml), is read off immediately after the end of shaking.

The compounds (I) are distinguished in particular by the fact that they are low-foam wetting agents. The term "low-foam" is subject to the definition above.

The compounds (I) can be prepared for example as follows: cyclic carbonates (1 mol) are reacted with an excess of amine (1.01 to 5 mol, preferably 1.05 to 2.5 mol). In this reaction it is preferred to introduce the amine, more particularly at about 45° C., and to add the cyclic carbonate dropwise; the temperature during the reaction ought not to exceed about 90° C. The reaction is carried out preferably in a temperature range from 60 to 70° C. After the end of reaction (evident from the amine number remaining constant), the excess amine is stripped off under reduced pressure. The ethoxylation and/or propoxylation of the intermediate obtained as described takes place under standard conditions (typically with KOH catalysis).

One example of the stated method for the synthesis of the compounds (I) is the reaction of ethylene carbonate with 2-ethylhexylamine to form an intermediate which is subsequently reacted with ethylene oxide. A specific implementation of this reaction is evident from the example section.

EXAMPLES

Example 1

Ethylene carbonate (Huntsman) and 2-ethylhexylamine were reacted. For this purpose, 1.05 mol of 2-ethylhexylamine was introduced into a four-neck flask and a gentle stream of nitrogen was passed over the solution, being employed throughout the reaction period. When the amine had been heated to 45° C., 1 mol of the ethylene carbonate was added to the amine from a dropping funnel, the reaction temperature not exceeding 60° C. During the following reaction period of 3.5 hours, the reaction temperature was held at 60° C. As soon as a constant amine number (potentiometric titration) was reached, reduced pressure was applied to strip off the excess amine. The slightly yellow intermediate obtained was ethoxylated under pressure with KOH catalysis, as follows: the intermediate (1.39 mol) and 2.22 g of KOH (50% strength by weight) were introduced. The system was evacuated at 30 mbar and 100° C. for 30 minutes, after which nitrogen was admitted. The reaction took place at 170-180° C. under a pressure of not more than 5 bar. After the end of the reaction, stirring was continued under 5 bar at 170° C. for 30 minutes.

The surface tension of this product was 31 mN/m. The viscosity was determined using a Brookfield RVT viscometer (at 50 rpm/24° C./spindle 3) and was 160 mPas. In the above-described foam test, the product gave a value of 11 ml.

What is claimed is:

1. A compound of the structure (I)

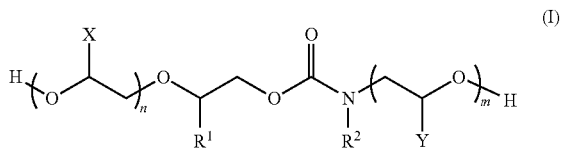

wherein
$R^1$ is hydrogen, an alkyl radical having 1 to 3 C atoms, or a group $R^3$;
$R^2$ is an alkyl group having 2 to 22 C atoms, wherein the alkyl group is linear or branched or cyclic, and saturated or mono- or poly-olefinically unsaturated;
$R^3$ is a saturated alkyl radical having 1 to 3 C atoms, and is substituted on one of the C atoms by a group —O—$(CH_2—CHZ—O)_p$—H;
X, Y, and Z independently of one another are a hydrogen radical or a methyl radical; and
n and m independently of one another are a number in the range from 1 to 45, and p is a number in the range from 0 to 45, with the proviso that the sum n+m+p is in the range from 2 to 70.

2. A method of forming a low-foam composition, the method comprising obtaining the compound of claim 1, and adding the compound to an aqueous medium to form the low-foam composition, wherein the compound is effective as a low-foam surfactant.

3. The compound of claim 1, wherein the radical $R^1$ is hydrogen.

4. The compound of claim 1, wherein the radical $R^1$ is an alkyl radical having 1 to 3 C atoms.

5. The compound of claim 1, wherein the radicals X, Y, and Z are hydrogen.

6. The compound of claim 1, wherein the sum n+m+p is in the range from 10 to 25.

7. The compound of claim 1, wherein the radical $R^1$ is hydrogen; the radical $R^2$ is a saturated, branched alkyl radical; the radicals X, Y, and Z are hydrogen; and the sum n+m+p (where p=0) is in the range from 10 to 25.

8. The compound of claim 7, wherein the radical $R^2$ is a 2-ethylhexyl group.

9. The compound of claim 1, wherein the radical $R^1$ is a group $R^3$; $R^3$ is $CH_2OH$; the radical $R^2$ is a saturated, branched alkyl radical; the radicals X, Y, and Z are hydrogen; and the sum n+m+p is in the range from 10 to 25.

10. The compound of claim 3, wherein the sum n+m+p is in the range from 10 to 25.

11. The compound of claim 4, wherein the sum n+m+p is in the range from 10 to 25.

12. The compound of claim 5, wherein the sum n+m+p is in the range from 10 to 25.

13. A low-foam composition comprising an aqueous medium and the compound of claim 1.

* * * * *